US007680465B2

(12) United States Patent
Zad-Issa

(10) Patent No.: US 7,680,465 B2
(45) Date of Patent: Mar. 16, 2010

(54) SOUND ENHANCEMENT FOR AUDIO DEVICES BASED ON USER-SPECIFIC AUDIO PROCESSING PARAMETERS

(75) Inventor: Mohammad Reza Zad-Issa, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 738 days.

(21) Appl. No.: 11/496,640

(22) Filed: Jul. 31, 2006

(65) Prior Publication Data

US 2008/0025538 A1 Jan. 31, 2008

(51) Int. Cl.
*H04B 1/38* (2006.01)
*H04M 1/00* (2006.01)
*H04R 25/00* (2006.01)

(52) U.S. Cl. .................. 455/90.2; 455/569.1; 455/41.3; 455/43; 381/312; 381/314; 381/104

(58) Field of Classification Search ................ 455/90.1, 455/90.2, 569.1, 41.2, 41.3, 42, 43; 381/312, 381/314, 322, 323, 385
See application file for complete search history.

(56) References Cited

U.S. PATENT DOCUMENTS 4,918,736 A 4/1990 Bordewijk
5,027,410 A * 6/1991 Williamson et al. .......... 381/320
5,721,783 A * 2/1998 Anderson .................... 381/328
5,768,397 A * 6/1998 Fazio .......................... 381/312
5,892,836 A * 4/1999 Ishige et al. ................. 381/316
6,094,481 A * 7/2000 Deville et al. .......... 379/388.03
6,684,063 B2 * 1/2004 Berger et al. ............... 455/90.1
7,469,051 B2 * 12/2008 Sapashe et al. ............. 381/104
7,529,545 B2 * 5/2009 Rader et al. .............. 455/432.2

OTHER PUBLICATIONS

"Digital Hearing Aids—Design Challenges and Recommended Devices", Sep. 4, 2006.
Bu, Linkai , "Perceptual Speech Processing and Phonetic Feature Mapping for Robust Vowel Recognition", *IEEE Transactions on Speech and Audio Processing*, vol. 8, No. 2,(Mar. 2000),105-114.
Clack, T. D., "Some Relations Between Speech Intelligibility And The Electro-Acoustic Characteristics Of Hearing Aids", *The C.W. Shilling Auditory*, Presented at the 13th annual Meeting, Oct. 9-13, 1961,(1961),6.
Demulder, T. , et al., "Recent Improvements of an Auditory Model Based Front-End for the Transcription of Vocal Queries", *IEEE ICASSP*, (2004),IV257-IV260.
Falk, Howard , "Prolog to Speech Coding: A Tutorial Review", *Proceedings of the IEEE*, vol. 82, No. 10,(Oct. 1994),1539-1540.

(Continued)

*Primary Examiner*—Duc M Nguyen
(74) *Attorney, Agent, or Firm*—Brake Hughes Bellermann LLP

(57) ABSTRACT

Various embodiments are disclosed relating to sound enhancement for wireless audio devices. A technique may include determining one or more user-specific audio processing parameters, receiving an RF signal from a first wireless device, demodulating the received RF signal to obtain an audio signal, processing the audio signal based on the one or more user-specific audio processing parameters to generate a user-specific audio signal. The user-specific audio processing parameters may be based on user preferences, or may, for example be based on a user auditory profile or other information to allow a received audio signal to be processed to at least partially compensate for a user's specific hearing impairment.

20 Claims, 3 Drawing Sheets

OTHER PUBLICATIONS

Ghitza, Oded , et al., "On The Perceptual Distance Between Speech Segments", *AT&T Bell Laboratories*, Acoustics Research Department, Murray Hill, New Jersey 38-39, Mar. 1996.

Loizou, Philipos C., "Introduction to Cochlear Implants", *IEEE Engineering In Medicine and Biology*, (Jan. 1999),32-42.

Najafzadeh-Azghandi, Hossein , "Perceptual Coding of Narrowband Audio Signals", *Department of Electrical & Computer Engineering*, McGill University, Montreal, Canada, (Apr. 2000),151.

Skarzynski, H. , et al., "Simulating the Perception of Audio by Hearing Impaired People", Presented at the 101st Convention Nov. 8-11, 1996 Los Angeles, California,(1996),17.

Spanias, Andreas S., "Speech Coding: A Tutorial Review", *Proceedings of the IEEE*, vol. 82, No. 10,(Oct. 1994),15411582.

Thomas, Ian B., et al., "Effects of Spectral Weighting of Speech in Hearing-Impaired Subjects", *Journal of the Audio Engineering Society*, vol. 22, No. 9, Department of Electrical and Computer Engineering, University of Massachusetts,(1974),690-694.

Villchur, Edgar, "Signal Processing to Improve Speech Intelligibility for the Hearing Impaired (Especially in Noise)", *Foundation for Hearing Aid Research*, Presented at the 99th Convention Oct. 6-9, 1995 New York,(1995),8.

Virag, Nathalie , "Single Channel Speech Enhancement Based on Masking Properties of the Human Auditory System", *IEEE Transactions on Speech and Audio Processing*, vol. 7, No. 2,(Mar. 1999),126-137.

* cited by examiner

SOUND ENHANCEMENT FOR AUDIO DEVICES BASED ON USER-SPECIFIC AUDIO PROCESSING PARAMETERS

BACKGROUND

A wide variety of audio devices are available, including speakers, audio headsets, and the like For example, audio headsets may be used for telephony, listening to music, listening to spoken words or speech, or otherwise receiving sound waves. Also, a number of electronic devices, such as computers, cell phones, personal digital assistants (PDAs), stereo systems, and the like, typically include speakers to allow audio signals such as music, speech, etc., to be output and heard by a user.

Unfortunately, some people have a hearing impairment or a hearing deficiency. These people may in some cases have a hearing profile that deviates from what may be considered "normal" or typical hearing characteristics. The deviations may range from a slight hearing loss to a severe hearing impairment. There are many different types of hearing impairments or hearing deficiencies. Such hearing impairment, at least in some cases, may inhibit or decrease a person's ability to receive or listen to audio signals from audio devices and other electronic equipment.

SUMMARY

Various embodiments are described relating to audio devices and audio signal processing, and also relating to sound enhancement for audio devices based on user-specific audio processing parameters. In an example embodiment, an audio device may process or modify an audio signal based on one or more user-specific audio processing parameters to generate a user-specific audio signal. For example, the user-specific audio processing parameters may be determined based on user preferences. In another example embodiment, the user-specific audio processing parameters may be determined based on a user auditory profile or other audio information for the user. In one example embodiment, the audio signal may then be modified or processed based on the user-specific audio processing parameters, e.g., to at least partially compensate for or address a user's specific hearing impairment.

In an example embodiment, a method is provided. The method may include determining one or more user-specific audio processing parameters, receiving an RF signal from a first wireless device, demodulating the received RF signal to obtain an audio signal, processing the audio signal based on the determined one or more user-specific audio processing parameters to generate a user-specific audio signal, and providing the user-specific audio signal to the user.

In an example embodiment, the determining may include determining an auditory profile for a user, and/or identifying signal processing to be performed on audio signals to at least partially compensate for a hearing impairment of the user. For example, the determining may include determining one or more user-specific coefficients for use by a digital signal processor to process audio signals, e.g., to compensate for a hearing impairment or deficiency of the user.

In another example embodiment, the determining may include determining an auditory profile for a user, wherein the auditory profile may include values relating to hearing or a hearing impairment for a user. The determining may further include determining one or more user-specific audio processing parameters based on the auditory profile for the user, wherein the user-specific audio processing parameters may relate to or may indicate signal processing to be performed on audio signals to at least partially compensate for a hearing impairment of the user. In yet another example embodiment, the determining may include receiving a selection via an input device of the one or more audio processing parameters. For example, the user-specific audio processing parameters may include one or more hardware related parameters, and/or values of one or more coefficients used or implemented by a digital signal processor to process the received audio signal.

The user-specific audio signal may be output to a user via an output device or speaker, for example. In another example embodiment, the user-specific audio signal may be modulated and transmitted as an RF signal via a wireless link to another wireless device, where the audio signal may be demodulated and output to the user.

In an example embodiment, in some cases, a user's hearing impairment or deficiency, may be compensated for, at least in part, by processing or modifying the received audio signal based on the user-specific audio processing parameters to provide a user-specific audio signal. The processing of the audio signal may include many different types of signal processing, such as, for example, background noise reduction, loudness recruitment compensation, transition enhancements, frequency shifting, duration modifications or time warping, or other audio signal processing.

In another example embodiment, an apparatus is provided. The apparatus may include a wireless interface adapted to receive and demodulate a received RF signal to obtain an audio signal, a memory adapted to store one or more user-specific audio processing parameters, and an audio processing circuit adapted to process the audio signal based on the one or more user-specific audio processing parameters to generate a user-specific audio signal. The apparatus may be adapted to provide the user-specific audio signal to the user.

The apparatus may include an output device or speaker for outputting the user-specific audio signal to the user. In an example embodiment, the audio processing circuit may be hardware and/or software, and/or may include a programmed digital signal processor. The apparatus may be or may be provided within a variety of devices, such as a cell phone or personal digital assistant (PDA), a wireless local area network (WLAN) device, a computer or laptop, an audio player such as an MP3 player, a multimedia device, an audio headset such as a Bluetooth audio headset, or other audio device. In one example embodiment, the one or more user-specific audio processing parameters may include an auditory profile of a user or information relating to an auditory profile of a user. In another example embodiment, the one or more user-specific audio processing parameters may include coefficients or other parameters relating to signal processing to be performed by the audio processing circuit on audio signals to at least partially compensate for a hearing impairment of the user.

In another example embodiment, a wireless audio headset or output device is provided. The wireless audio headset or output device may be, for example, a Bluetooth compatible audio headset, or other audio device. Other types of wireless audio devices may be provided. The wireless audio headset or device may include a wireless interface adapted to receive and demodulate a received RF signal to obtain an audio signal, a memory adapted to store one or more user-specific audio processing parameters, an audio processing circuit adapted to process the audio signal based on the one or more user-specific audio processing parameters to generate a user-specific audio signal, and one or more speakers or other output devices adapted to output the user-specific audio signal.

The details of one or more implementations or example embodiments are set forth in the accompanying drawings and the description below. Other features will be apparent from the description and drawings, and from the claims.

DETAILED DESCRIPTION

First Example Configuration—Signal Processing at Audio Device 130

Figure 1:
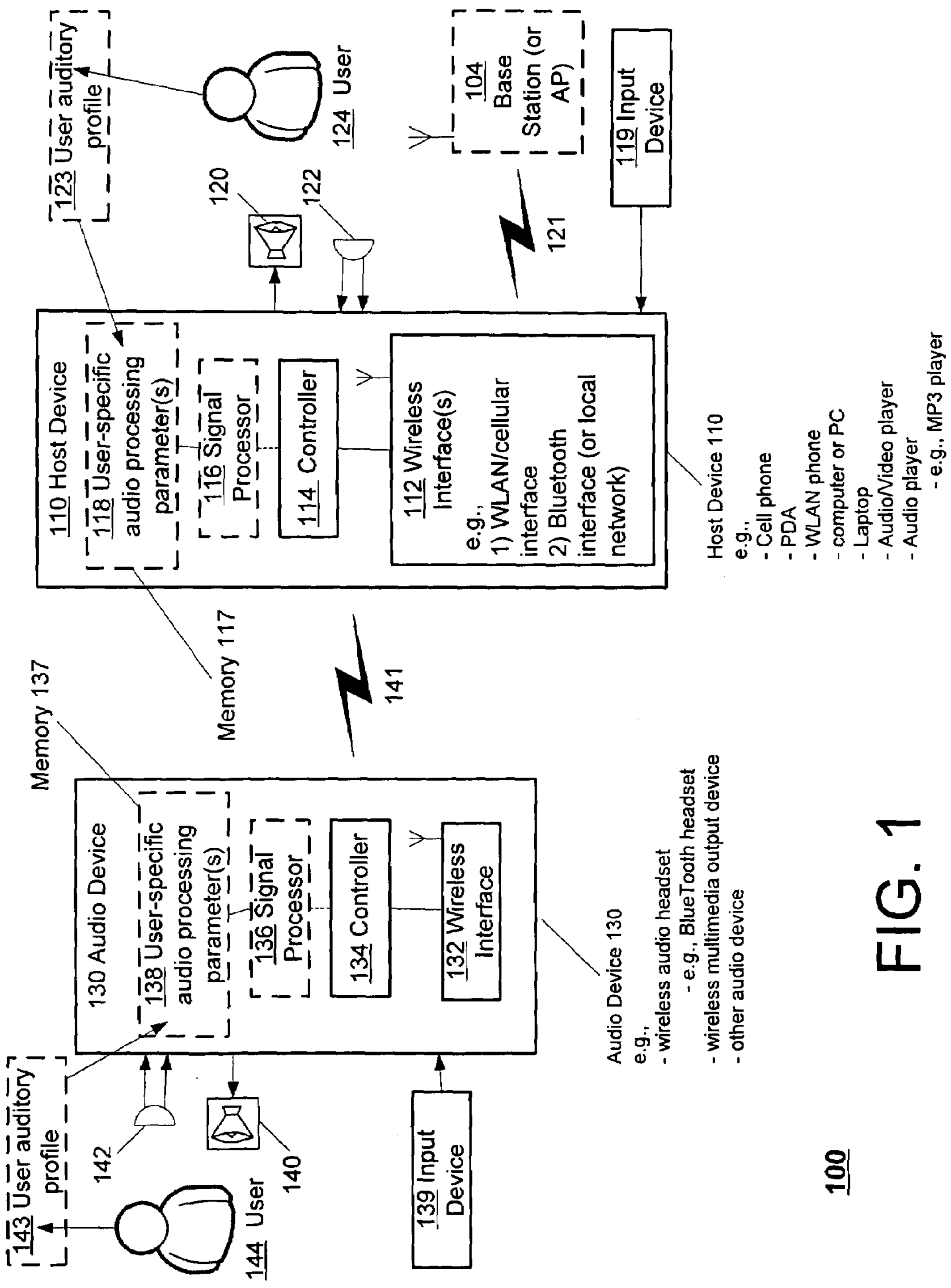
FIG. 1 is a block diagram illustrating a system that may be used to enhance sound according to an example embodiment.

FIG. 1 is a block diagram illustrating a system according to an example embodiment. A system 100 is illustrated in FIG. 1. System 100 may include a host device 110 and/or an audio device 130, depending on the embodiment.

Audio device 130 may be any audio device (or audio output device), such as a wireless audio headset (e.g., Bluetooth or Bluetooth compatible wireless audio headset), a wireless multimedia output device which may output both audio and video information, or other audio device.

Audio device 130 may include a controller 134 for providing overall control for device 130. Controller 134 may include hardware and/or software, such as a programmed micro-controller or microprocessor, for example.

Audio device 130 may also include a wireless interface 132 to modulate and transmit, and to receive and demodulate RF (radio frequency) signals via a wireless link 141. Wireless interface 132 may, for example, further process the demodulated signal, such as channel decoding, synchronization, error detection and/or correction, source decoding, and other processing, which may be performed to obtain an audio signal in the received RF signal. (Similar, but reverse, signal processing steps of processing may be performed by interface 132 to modulate and process signals for transmission over a wireless link, such as source coding, channel coding, modulation, etc.). The RF signals may be transmitted and received on any frequency such as signals in the MHz range, the GHz range, or other frequency range. For example, wireless interface 132 may include a Bluetooth wireless interface (e.g., including a wireless transmitter and receiver, or transceiver) adapted to receive and transmit signals via a Bluetooth wireless link. Bluetooth wireless technology allows devices to communicate via wireless link, and may use the unlicensed radio frequency (RF) spectrum in the 2.4-2.4835 GHz range. The term RF is not limited to any particular frequency range, but may include any frequency range suitable for wireless transmission.

Audio device 130 may include an input device 139 to allow a user to input information, user selections, etc. Input device 139 may include a keypad or keyboard, a mouse or pointing device, or other input device. Audio device 130 may also include an input device 140, such as a microphone, to input audio signals, and an output device 142, such as one or more speakers to output audio signals to a user 144.

In an example embodiment, audio device 130 may also include a memory 137 to store one or more user-specific audio processing parameters 138. In one example embodiment, a signal processor 136 (or audio processing circuit) may also be provided. Signal processor 136 may include hardware, software, configurable logic, a programmable digital signal processor, and/or other processing circuits, or a combination thereof.

Signal processor 136 may, for example, process a received audio signal based on the user-specific audio processing parameters 138 to generate a user-specific audio signal. The user-specific audio processing parameters 138 may include values or parameters relating to or describing signal processing to be performed on audio signals, e.g., to generate a user-specific audio signal that has been modified or customized based on user preferences or to compensate for a hearing impairment of the user 144, as examples. The user-specific audio signal may be output via output device (e.g., speaker) 140 to user 144. The user-specific audio processing parameters 138 and operation of signal processor 136 will now be described in further detail.

In an example embodiment, user-specific audio processing parameters 138 may include values or parameters that may relate to or describe signal processing to be performed on audio signals to generate user-specific audio signals. The parameters 138 may include, for example, coefficients for use by a programmable digital signal processor (e.g., signal processor 136), or hardware-related parameters (e.g., values to select one or more capacitors), etc. Thus, the user-specific audio processing parameters may reflect or indicate user preferences in terms of sound or speech quality, loudness or volume, or other audio or speech characteristics that may be selected or customized by a user (e.g., even for user's without hearing impairment, for example). For example, user-specific audio processing parameters 138 may be downloaded and stored in memory 137, may be input or selected by user 144 using input device 139, or otherwise provided.

An RF signal may be received by wireless interface 132 via wireless link 141. Wireless interface 132 may, for example, demodulate the received RF signal to obtain an audio signal (e.g., music, speech, or the like). As noted above, wireless interface 132, in an example embodiment, may perform additional processing on the demodulated signal, such as channel decoding, synchronization, error detection and/or correction, source decoding, and other processing, which may be performed to obtain an audio signal in the received RF signal. Signal processor 136 may then process or modify the audio signal based on the user-specific audio processing parameters 138 to generate a user-specific audio signal. The processing may include, for example, adjusting the gain or amplitude (e.g., volume) at one or more frequencies or bands, performing noise suppression or noise cancellation, performing band shifting or frequency shifting, or other audio processing. The user-specific audio signal may then be output or played to user 144 via output device or speaker(s) 140. In this manner, audio device 130 may generate a user-specific audio signal that has been modified or customized in accordance with user preferences. For example, this example operation may be performed for any user, e.g., regardless whether the user has a hearing impairment.

In another an example embodiment, a user 144, may have a hearing impairment or hearing deficiency. An example operation of audio device 130 will now be briefly described where audio device 130 may modify an audio signal to compensate for a user's hearing impairment.

A user auditory profile 143, or other user-specific audio information, may be generated or provided for the user 144. The user auditory profile 143 may include information relating to the ability of user 144 to hear, and may, for example, be generated based on one or more audio or hearing tests. For example, the user auditory profile 143 may contain results of the user's hearing performance related to: 1) audio tones at different frequencies and levels (e.g., frequency resolution), 2) input dynamic range (loudness resolution), 3) inter-word pause duration (temporal resolution), 4) sensitivity to background noise, and other hearing characteristics. These are merely a few examples of tests and hearing characteristics that may be included within user auditory profile 143, and the embodiments are not limited thereto.

In an example embodiment, a simple user auditory profile may include a user audiogram, in which audio tones at different frequencies are provided to the user to determine the lowest volume or threshold that is detectable by the user for each of a plurality of frequencies. Therefore, the audiogram may provide information indicating that the user has difficulty hearing one or more specific frequencies, for example. This is merely one example, and many other hearing tests and/or hearing characteristics may be provided.

According to an example embodiment, one or more user-specific audio processing parameters 138 may be determined. In an example embodiment, the user-specific audio processing parameters may be or may include the user auditory profile 143, or information related to the user auditory profile 143.

In another example embodiment, the user-specific audio processing parameters 138 may be input or selected manually by a user 144, e.g., by selecting or inputting the parameters 138 using input device 139. In another example embodiment, the user-specific audio processing parameters 138 may be determined or generated based upon the user auditory profile 143 or other audio information. For example, the user-specific audio processing parameters 138 may be parameters or values (e.g., values of coefficients for use by a digital signal processor, or other values) to be used by signal process 136 to process audio signals to at least partially compensate for a user's hearing impairment, e.g., as reflected by the user auditory profile 143. In an example embodiment, determining the user-specific audio processing parameters 138 may include programming or configuring signal processor 136, e.g., by adjusting one or more parameters, coefficients or other values, for example.

In an example embodiment, an RF signal may be received via wireless link 141 and demodulated by wireless interface 132 to obtain an audio signal that was modulated onto the received RF signal. Wireless interface 132 may perform further signal processing on the demodulated signal, according to an example embodiment, as noted above. Receiving an RF signal via wireless link 141 may include, for example, receiving an RF signal via a wireless link from a WLAN (wireless LAN) device such as from a WLAN station or WLAN access point (AP), receiving a RF signal via a Bluetooth wireless link, receiving an RF signal via cellular wireless link from a PDA or cell phone or base station, for example. These are merely some examples, and the embodiments are not limited thereto.

Signal processor 136 may then process the received audio signal based on the user-specific audio processing parameters 138, e.g., to at least partially compensate for the user's hearing impairment or hearing deficiency. The processing the audio signal may include, for example, adjusting a gain (or amplitude) of one or more frequencies or bands, performing background noise reduction, loudness recruitment compensation, performing transition enhancements, performing duration modifications or time warping, for example. Many other types of audio processing may be performed on received audio signals (e.g., music, sounds, speech). In this manner, a wireless or RF signal may be received (e.g., including an audio signal) and the received audio signal may be modified or processed to generate a user-specific audio signal, e.g., to at least partially compensate for a user's specific hearing impairment. For example, a wireless audio headset (e.g., a Bluetooth wireless audio headset or device) may modify or process audio signals to generate a user-specific audio signal that may be specifically tailored or customized, e.g., based on the user's preferences or to compensate or address the user's specific hearing impairment.

Second Example Configuration—Signal Processing at Host Device 110 for Output Host device 110 will now be described in more detail. Host device 110 may be or may include a wide variety of computing devices or audio devices, such as a cell phone, a PDA, a WLAN phone or device, a computer or PC, a laptop, an audio/video player or multimedia device, an audio player (such as an MP3 player with Bluetooth wireless interface), or other device. Host device 110 may include a controller 114 to provide overall control, and an input device 119 (e.g., keypad, mouse) to receive user input or a user selection, and other information. Host device 110 may also include an input device 122 (e.g., microphone) to receive audio signals and an output device 120 (e.g., speaker) to output audio signals to a user 124, for example.

Host device 110 may also include a wireless interface 112, which may include one or more wireless interfaces. For example, wireless interface 112 may include two wireless interfaces, including 1) a WLAN or cellular interface for communicating with a base station 104 or AP (access point), or other device via wireless link 121, and 2) a Bluetooth interface for communicating with audio device 130 via a Bluetooth wireless link 141, for example. The Bluetooth interface and the cellular/WLAN interface are merely examples, and wireless interface 112 is not limited thereto.

In an example embodiment, host device 110 may include user-specific audio processing parameters 118 stored in memory 117. The parameters 118 may, for example, be downloaded or may be selected or input by a user 124 (coupled to audio device 130). The user-specific audio processing parameters 118 may be determined or based on user preferences, or may, for example be based on a user auditory profile 123 or other information for user 124 to allow a received audio signal to be processed to at least partially compensate for a specific hearing impairment for user 124. Therefore, an audio signal (e.g., speech signal or telephone signal) may be modulated and transmitted by base station 104 via wireless link 121. Wireless interface 112 of host device 110 may receive and demodulate the received RF signal to obtain the audio signal (e.g., by cellular interface). Similar to wireless interface 132, wireless interface 112 may, in an example embodiment, perform various additional types of processing to obtain an audio signal from the received RF signal (in addition to demodulation), such as channel decoding, synchronization, error detection and/or correction, source decoding, and other processing, which may be performed to obtain an audio signal in the received RF signal. Signal processor 116 may then process the audio signal based on the user-specific audio processing parameters 118 to obtain a user-specific audio signal, which may be output to user 124 via output device 120. In this manner, host device 110 may operate without (or independent of) audio device 110, to generate and output a user-specific audio signal to a user 124.

Third Example Configuration—Signal Processing at Host Device 110 and Transmitting the User-Specific Audio Signal to Audio Device 130 for Output In an alternative embodiment, the audio signal processing to generate a user-specific audio signal may be performed by the host device 110 instead of by audio device 130. Note that in this example embodiment, the host device 110 may generate the user-specific audio signal for a user 144. The user specific audio signal may then be transmitted to audio device 130 for output to user 144.

For example, in this example embodiment, a user 144 may be operating a cell phone 110, while wearing a Bluetooth headset 130, and the signal processing may be performed by the cell phone 110, for example. Therefore, host device 110 may include user-specific audio processing parameters 118 stored in memory 117 for user 144. The parameters 118 may, for example, be downloaded or may be selected or input by a user 144. The user-specific audio processing parameters 118 may be determined or based on user preferences of user 144, or may, for example be based on a user auditory profile 143 or other information for user 144 to allow a received audio signal to be processed to at least partially compensate for a specific hearing impairment for user 144.

Therefore, in this alternative embodiment, an RF signal may be received via wireless link 121 and demodulated by wireless interface 112 (e.g., by cellular interface) to obtain an audio signal. In an example embodiment, wireless interface 112 may perform further signal processing on the demodulated signal, such as channel decoding, synchronization, error detection and/or correction, source decoding, and other processing, which may be performed to obtain an audio signal in the received RF signal. Signal processor 116 may process or modify the received audio signal based on the user-specific audio processing parameters 118 to obtain the user-specific audio signal (e.g., specific to user 144). The user-specific audio signal may then be modulated (e.g., by Bluetooth interface) and transmitted via wireless link 141 to audio device 130. The wireless interface 132 of audio device 130 may then demodulate the received RF signal to obtain the user-specific audio signal for output to user 144 via output device 140. Therefore, in this example embodiment, the audio signal processing (e.g., to generate the user-specific audio signal) may be performed at the host device 110 for user 144 (e.g., signal processor 136 and parameters 138 may be omitted in this example embodiment).

Therefore, the audio signal processing to generate a user-specific audio signal may be performed at the audio device 130 for a user using the audio device 130 (e.g., the first example configuration), at the host device 110 for a user using the host device 110 (e.g., the second example configuration), or at the host device 110 for a user that will then receive the user-specific audio signals at audio device 130 (e.g., the third example configuration). Thus, the audio signal processing and user-specific audio processing parameters may be provided at either host device 110 and/or audio device 130. These are merely some example configurations or embodiments, and other embodiments or configurations may be provided.

Audio device 130 (or host device 110) may perform one or more additional audio processing tasks on a received audio signal. These audio processing tasks may include, for example, a signal processing function implemented to support a feature (e.g., an MP3 decoder); a handler of various sources of distortion, such as noise, echo, acoustic shock, etc; or an enhancer of the speech quality as perceived by the user (e.g., increase user satisfaction and enhance the ease of conversation using automatic level control, post filters, echo cancellation, noise reduction, etc).

Figure 2:
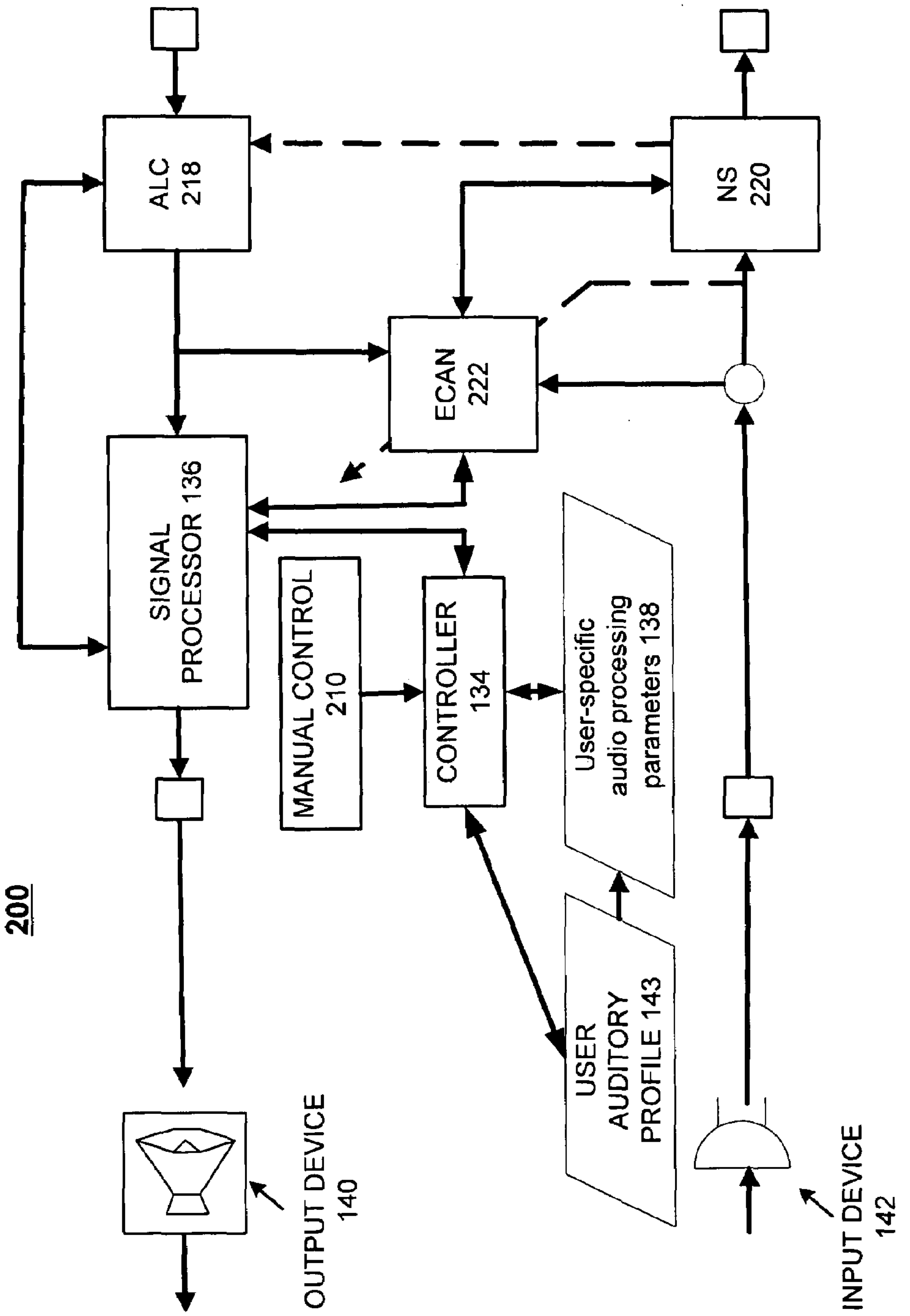
FIG. 2 is a block diagram of a system that may be used to enhance sound by processing an audio signal.

FIG. 2 is a block diagram of a system 200 that may be used to enhance sound by processing an audio signal. This may be performed, for example, by mapping an input audio signal to an output audio signal based on one or more user-specific audio processing parameters 138 and/or based upon a user auditory profile 143. The system 200 may include an input device 142 and an output device 140. Between the receive out an input device 142 and an output device 140 may be a plurality of components or blocks including an noise suppression (NS) block 220; an automatic level control (ALC) block 518, an echo cancellation (ECAN) block 222, a signal processor 110. A controller 134 may be coupled to the user signal processor 136. A manual control block 210 may be connected to the controller 134 for manual control, e.g., to allow a user to input or select one or more user-specific audio processing parameters.

The ECAN block 222 may perform echo and noise cancelling, for example, by attempting to cancel the acoustic noise or echo for system 200. The NS block 220 may be used to reduce the level of background noise. The signal processor 136 may be, for example, a standalone component or a component of a post-filter. Typically, the role of the post-filter may be to enhance the components of the speech signal that may be most relevant to impacting the quality and the intelligibility of the received sound waves. For example, some post-filters emphasize formants (where vocal tract resonances may be located) and pitch (vibration of vocal chords).

The ALC block 218 may attempt to adjust the sound signal sent to the output device 140 based upon the level of noise in the environment. Typically, the louder the noise in the environment, the more difficult it may be for the user to hear the sound waves produced by the output device 140. In such a case where there is high local background noise, for example, the ALC block 218 may automatically increase the output volume to output device 140 so that a far end speaker may be more easily heard.

Figure 3:
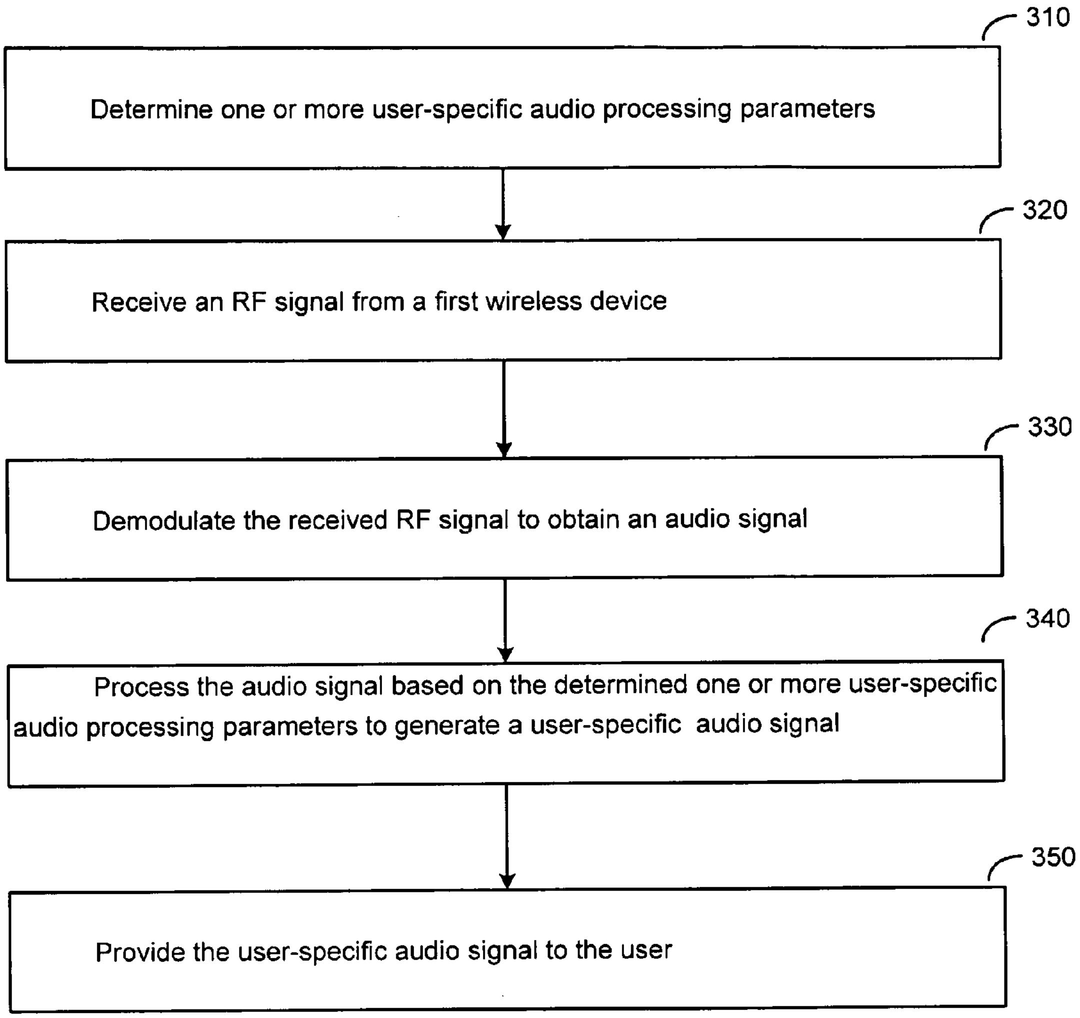
FIG. 3 is a flowchart illustrating operation of a device to enhance sound according to an example embodiment

FIG. 3 is a flowchart illustrating operation of a device to enhance sound according to an example embodiment. At 310, one or more user-specific audio processing parameters may be determined. According to an example embodiment, the user-specific audio processing parameters may be determined based on user preferences, may be a user auditory profile, or may, for example include coefficients or values based on a user auditory profile or other information to allow a received audio signal to be processed to at least partially compensate for a user's specific hearing impairment.

At 320, an RF signal may be received from a first wireless device.

At 330, the received RF signal may be demodulated to obtain an audio signal. In another example embodiment, further signal processing may be performed as well.

At 340, the audio signal may be processed based on the determined one or more user-specific audio processing parameters to generate a user-specific audio signal.

At 350, the user-specific audio signal may be provided to the user. This may include outputting the user-specific audio signal to a user via an output device or speaker. It may alternatively include transmitting the user-specific audio signal to another wireless device where the user-specific audio signal may be output to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:

providing a manual control to receive a user input selection of one or more user-specific audio processing parameters;

determining one or more user-specific audio processing parameters in response to user input received at the manual control;

receiving an automatic level control signal responsive to background noise;

receiving an RF signal from a first wireless device;

demodulating the received RF signal to obtain an audio signal;

processing the audio signal based on both (i) the received automatic level control signal and (ii) the determined user-specific audio processing parameters to generate a user-specific audio signal; and providing the user-specific audio signal to the user.

2. The method of claim 1 wherein the determining comprises determining an auditory profile for a user, and/or identifying signal processing to be performed on audio signals relating to a hearing preference of the user and/or to at least partially compensate for a hearing impairment of the user.

3. The method of claim 1 wherein the determining comprises determining one or more user-specific coefficients for use by a digital signal processor to process audio signals.

4. The method of claim 1 wherein the determining comprises:

determining an auditory profile for a user, the auditory profile including values relating to hearing or a hearing impairment for a user;

determining one or more user-specific audio processing parameters based on the auditory profile for the user, the user-specific audio processing parameters relating to signal processing to be performed on audio signals relating to a hearing preference of the user and/or to at least partially compensate for a hearing impairment of the user.

5. The method of claim 1 wherein the determining comprises receiving a selection via an input device of the one or more audio processing parameters.

6. The method of claim 1 wherein the receiving an RF signal comprises at least one of:

receiving an RF signal via wireless link from a cellular base station;

receiving a RF signal at a cellular phone or WLAN phone from a base station or access point;

receiving an RF signal via a wireless link from a WLAN device;

receiving an RF signal via a wireless link from an access point;

receiving an RF signal via a Bluetooth wireless link; and receiving an RF signal at a wireless audio headset via a Bluetooth wireless link from the first device.

7. The method of claim 1 wherein the processing the audio signal comprises at least one of:

adjusting a gain in one or more frequency bands;

background noise reduction;

loudness recruitment compensation;

transition enhancements;

frequency shifting; or duration modifications or time warping.

8. The method of claim 1 wherein the providing comprises outputting the user-specific audio signal to the user via an output device or speaker.

9. The method of claim 1 wherein the providing comprises:

modulating the user-specific audio signal; and transmitting the modulated user-specific audio signal as an RF signal to a second wireless device for output to the user.

10. The method of claim 1 wherein the providing comprises:

modulating the user-specific audio signal; and transmitting the modulated user-specific audio signal as an RF signal to a second wireless device for output to the user, wherein the second wireless device is configured to perform operations comprising:

demodulating the modulated user-specific audio signal; and outputting the user-specific audio signal to the user via an output device or speaker.

11. An apparatus comprising:

a wireless interface adapted to receive and demodulate a received RF signal to obtain an audio signal;

a manual control to receive a user input of one or more user-specific audio processing parameters;

a memory adapted to store one or more of the received user-specific audio processing parameters;

a controller coupled to the manual control and configured to output one or more of the user-specific audio processing parameters in response user input to the manual control;

an automatic level controller configured to output an automatic level control signal responsive to background noise levels;

an audio processing circuit coupled to the output of the controller and coupled to the output of the automatic level controller and adapted to process the audio signal based on both (i) the automatic level control signal and (ii) the one or more user-specific audio processing parameters to generate a user-specific audio signal; and an audio output device coupled to the audio processing circuit and adapted to provide the user-specific audio signal to the user.

12. The apparatus of claim 11 wherein the one or more user-specific audio processing parameters comprises an auditory profile of a user or information relating to an auditory profile of a user.

13. The apparatus of claim 11 wherein the one or more user-specific audio processing parameters comprises coefficients or other parameters relating to signal processing to be performed by the audio processing circuit on audio signals relating to a hearing preference of the user and/or to at least partially compensate for a hearing impairment of the user.

14. The apparatus of claim 11 wherein the apparatus comprises at least one of:

a cell phone or PDA;

a WLAN device;

a computer;

an audio player;

an MP3 player;

an audio headset;

a Bluetooth audio headset or Bluetooth audio output device; or a multimedia output device.

15. The apparatus of claim 11 and further comprising an audio output device or speaker adapted to output the user-specific audio signal.

16. The apparatus of claim 11 wherein the wireless interface is adapted to receive, via first wireless link, and demodulate a RF signal to obtain an audio signal, the wireless interface further adapted to modulate and transmit the user-specific audio signal via a second wireless link to a second wireless device.

17. The apparatus of claim 11 wherein the audio processing circuit comprises at least one of:

hardware and/or software; or a digital signal processor adapted to modify one or more coefficients based on the user auditory profile.

18. A wireless audio headset or output device comprising:

a wireless interface adapted to receive and demodulate a received RF signal to obtain an audio signal;

a manual control to receive a user input of one or more user-specific audio processing parameters;

a memory adapted to store the one or more user-specific audio processing parameters;

a controller coupled to the manual control and configured to output one or more of the user-specific audio processing parameters in response user input to the manual control;

an automatic level controller configured to output an automatic level control signal responsive to background noise levels;

an audio processing circuit coupled to the output of the controller and coupled to the output of the automatic level controller and adapted to process the audio signal based on both (i) the automatic level control signal and (ii) the one or more user-specific audio processing parameters to generate a user-specific audio signal; and one or more speakers or other output devices adapted to output the user-specific audio signal.

19. The wireless audio device of claim 18 and further comprising an input device adapted to allow a user to input or select the one or more user-specific audio processing parameter.

20. The wireless audio device of claim 18 wherein the apparatus comprises a wireless Bluetooth compatible audio headset.

* * * * *